United States Patent
Arumugam et al.

(10) Patent No.: US 12,082,583 B2
(45) Date of Patent: *Sep. 10, 2024

(54) WOOD PRESERVATIVES

(71) Applicants: Nutrition & Biosciences USA 2, LLC, Rochester, NY (US); MC (US) 3 LLC, Wilmington, DE (US)

(72) Inventors: Selvanathan Arumugam, Blue Bell, PA (US); David M Laganella, Swedesboro, NJ (US); Kevin B. Vargo, Collegeville, PA (US)

(73) Assignees: Nutrition & Biosciences USA 2, LLC, Rochester, NY (US); MC (US) 3 LLC, Wilmington, DE (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/497,089

(22) PCT Filed: Mar. 29, 2018

(86) PCT No.: PCT/US2018/025046
§ 371 (c)(1),
(2) Date: Sep. 24, 2019

(87) PCT Pub. No.: WO2018/183615
PCT Pub. Date: Oct. 4, 2018

(65) Prior Publication Data
US 2021/0112812 A1    Apr. 22, 2021

Related U.S. Application Data

(60) Provisional application No. 62/479,810, filed on Mar. 31, 2017.

(51) Int. Cl.
*A01N 43/80* (2006.01)
*C08G 18/75* (2006.01)

(52) U.S. Cl.
CPC ........... *A01N 43/80* (2013.01); *C08G 18/755* (2013.01)

(58) Field of Classification Search
None
See application file for complete search history.

(56) References Cited

U.S. PATENT DOCUMENTS

| | | | |
|---|---|---|---|
| 5,023,309 A | 6/1991 | Kruse et al. | |
| 5,478,866 A | 12/1995 | Obata et al. | |
| 6,437,020 B1 | 8/2002 | Amick et al. | |
| 6,610,282 B1 | 8/2003 | Ghosh | |
| 7,740,906 B2 | 6/2010 | Ashmore et al. | |
| 7,959,723 B2 | 6/2011 | Llosas et al. | |
| 9,273,210 B2 * | 3/2016 | Schrinner | C08G 18/0823 |
| 9,402,860 B2 | 8/2016 | Kovacs et al. | |
| 2002/0115765 A1 | 8/2002 | Amick et al. | |
| 2003/0018760 A1 | 6/2003 | Haas et al. | |
| 2006/0240263 A1 * | 10/2006 | Ashmore | C08L 97/02 428/414 |
| 2006/0276468 A1 * | 12/2006 | Blow | A01N 47/24 514/232.5 |
| 2011/0098417 A1 | 4/2011 | Worley et al. | |
| 2015/0274876 A1 * | 10/2015 | Faust | C08G 18/6511 525/123 |
| 2021/0112812 A1 | 4/2021 | Arumugam | |

FOREIGN PATENT DOCUMENTS

| | | |
|---|---|---|
| EP | 1113043 A2 | 7/2001 |
| EP | 1714757 B1 | 10/2006 |
| WO | WO 97/02134 A1 | 1/1997 |
| WO | WO 07/019237 A1 | 2/2007 |
| WO | WO 08/078720 A1 | 7/2008 |
| WO | WO 2008/083462 A1 | 7/2008 |
| WO | WO 2009/129587 A1 | 10/2009 |
| WO | WO 2010/148450 A1 | 12/2010 |
| WO | WO 2013/098579 A1 | 7/2013 |
| WO | WO 17/095335 A1 | 6/2017 |

OTHER PUBLICATIONS

International Search Report from corresponding International Application No. PCT/US2018/025046, dated Apr. 10, 2018.
Coneski et al, "Enhancing the Fouling Resistance of Biocidal Urethane Coatings via Surface Chemistry Modulation," Langmuir, ACS Publications, 2012, 28, pp. 7039-7048.
Chun Feng Ma et al, "Degradable Polymers for Marine Antibiofouling: Optimizing Structure to Improve Performance", Industrial & Engineering Chemistry, Research, ACS Publications, vol. 55, No. 44, Nov. 9, 2016 (Nov. 9, 2016), pp. 11495-11501.

* cited by examiner

*Primary Examiner* — Abigail Vanhorn
*Assistant Examiner* — Ali S Saeed
(74) *Attorney, Agent, or Firm* — Howson & Howson, LLP; Colleen M. Schaller

(57) ABSTRACT

A method for preserving wood by contacting wood with a composition comprising a polyurethane polymer, non-aqueous solvents, and a wood preservative.

8 Claims, No Drawings

WOOD PRESERVATIVES

The present invention relates to a method for treating wood to impart protection from wood-decaying organisms.

There are many methods and compositions for preserving wood prior to the time the wood is put in use. Also, preservatives for treating wood in place are available on the market including both oil-based and water-based products. The oil-based products generally consist of petroleum oils with pentachlorophenol or creosote, U.S. Pat. No. 7,959,723 describes one such composition employing oil-soluble preservatives for wood. From the standpoint of toxicity and environmental pollution, these active ingredients are less than desirable.

The problem addressed by this invention is the need for a more environmentally friendly wood treatment composition which is capable of efficaciously imparting active ingredients.

The present invention is directed to a method for preserving wood; said method comprising contacting wood with a wood treatment composition comprising: a) a polyurethane polymer comprising a polyol and an isocyanate in a non-aqueous solvent; b) at least one organic solvent; and c) at least one wood preservative selected from among halogenated isothiazolinone biocides, halogenated carbamate fungicides and azole fungicides.

The present invention is further directed to a wood preservation composition comprising: a) a polyurethane polymer comprising a polyol and an isocyanate in a non-aqueous solvent; b) at least one organic solvent; and c) at least one wood preservative selected from among halogenated isothiazolinone biocides, halogenated carbamate fungicides and azole fungicides.

All percentages and part per million (ppm) values are on the basis of total weight of the composition, unless otherwise indicated. The terms "a" or "an" refer both to the singular case and the case where more than one exists. All range endpoints are inclusive and combinable. It is envisioned that one skilled in the art could select and/or combine multiple suitable and/or preferred embodiments in the present invention.

Polyurethane polymers, as used herein, typically are formed from reaction of isocyanates with polyols, but may contain other functional groups derived from reaction of isocyanates with other monomers, e.g., amide groups derived from carboxylic acids, and ureas derived from amines, e.g. ethylene diamine (EDA) or other polymers, such as polyesters, e.g., polyesters derived from adipic acid and 1,6-hexanediol, 1,4-butanediol and/or neopentyl glycol, or polycarbonates, e.g. polycarbonates derived from poly 1,6-hexanediol carbonate. Suitable isocyanates include, e.g., methylene bis(4-cyclohexylisocyanate) (MCI), methylene bis(4-phenylisocyanate) (MDI), polymethylenepolyphenol isocyanate (pMDI), hexamethylene diisocyanate (HDI), isophorone diisocyanate (IPDI) and toluene diisocyanate (TDI) and combinations thereof. Preferably, the isocyanates of the present invention are IPDI, pMDI, MDI and combinations thereof. More preferably, the isocyanate is IPDI. The polyol used to make the polyurethane comprises p-butylene oxide, p-propylene oxide, p-tetrahydrofuran, or combinations thereof. Suitably, the polyol used to make the polyurethane comprises at least 83% p-butylene oxide. Suitably, the polyol is 100% p-butylene oxide, 6 to 99.99% p-butylene oxide+0.01 to 94% p-propylene oxide, or 83 to 99.99% p-butylene oxide+0.01-17% p-tetrahydrofuran. Suitably the isocyanate to polyol molar ratio of the polyurethane polymers is form less than 4 to greater than or equal to 0.5, alternatively from less than or equal to 2 to greater than or equal to 0.5.

Polyurethane polymers of the present invention may be capped or uncapped. If the polyurethane is capped, an amine or alcohol is suitable as a capping agent. Preferably, the polyurethane is capped with a monoamine or monoalcohol, for example butyl amine, octanol, octyl amine or combinations thereof.

The polyurethane polymer is synthesized in a non-aqueous solvent or a mixture of non-aqueous solvents. Preferably, the amount of solvent is from 60% to 90%, more preferably from 70% to 90%, and most preferably from 75% to 90%. Suitable solvents include ester and ether solvents having a boiling point of at least 150° C., and preferably a flash point of at least 60° C. Examples of such solvents include, alkanes, branched alkanes, aromatics, e.g., Mineral spirits, toluene, benzyl alcohol, xylenes, and alkyl benzenes. A suitable mixture of non-aqueous solvents useful in the present invention is Aromatic 200.

The wood treatment composition of the present invention, in addition to polyurethane polymer, further comprises a wood preservative. The wood preservative may be selected from the class of halogenated isothiazolinone biocides, halogenated carbamate fungicides, metal salts of naphthenic acids, and azole fungicides. When the wood preservative is a halogenated isothiazolinone biocide, it preferably comprises a 3-isothiazolone having a $C_4$-$C_{12}$ N-alkyl substituent, more preferably a chlorinated 3-isothiazolone, and most preferably 4,5-dichloro-2-n-octyl-4-isothiazolin-3-one ("DCOIT"). Mixtures of wood preservatives may be used. When the polyurethane polymer is combined with DCOIT a suitable composition includes 23% polyurethane polymer solids, 23% DCOIT, and 54% Aromatic 200.

The composition used to treat wood preferably contains from 100 ppm to 40,000 ppm wood preservative, more preferably from 200 ppm to 30,000 ppm, and most preferably from 300 ppm to 25,000 ppm. Preferably, the polymer solids content of the composition is from 10% to 40%, more preferably from 10% to 30%, and most preferably from 15% to 30%. Preferably, the polymer solids to biocide ratio is from 2:1 to 1:2, more preferably from 2:1 to 1:1.

Another critical element of the wood preservation composition is an organic solvent. The polyurethane polymer is diluted with organic solvent. Suitably, the organic solvent is diesel, however other organic solvents known to those of skill in the art may be used. In some embodiments the organic solvent is not the same compound as the non-aqueous solvent of the present invention. As used herein, diesel is defined as the fractional distillation of crude oil between 200° C. (392° F.) and 350° C. (662° F.) at atmospheric pressure, resulting in a mixture of carbon chains that typically contain between 8 and 21 carbon atoms per molecule or biodiesel that is obtained from vegetable oil or animal fats (biolipids) which have been transesterified with methanol (fatty-acid methyl ester (FAME)) and mixtures thereof.

The compositions used in the present invention may optionally contain additional components including but not limited to stabilizers, dyes, water repellents, other wood biocides, fungicides and insecticides, antioxidants, metal chelators, radical scavengers, etc. Stabilizers include, e.g., organic and inorganic UV stabilizers, such as, copper oxide or other copper salts or complexes that resist leaching; zinc oxide; iron salts, iron oxide, iron complexes, transparent iron oxide and nanoparticle iron oxide; titanium dioxide; benzophenone and substituted benzophenones; cinnamic acid and its esters and amides; substituted triazines, such as triphenyl triazine and substituted phenyl triazine UV absorbers, benzotriazole and substituted benzotriazole UV absorbers; hindered amine light stabilizers, used individually or in combination. Water repellents include, e.g., various wax-type water repellents, e.g., paraffin, carnauba, and polyethylene waxes; and silicones. Other wood biocides, fungicides, such as copper metal, bethoxazin and cyproconazole, chlorothalonil, tebuconazole, propiconazole, pentachlorophenol, creosote, copper napthenate, dialkyl dimethyl quaternary ammonium carbonate/bicarbonate, and insecticides include, e.g., those listed in U.S. Pat. No. 6,610,282, e.g., imidacloprid, thiacloprid, permethrin, and etofenprox. Antioxidants include any commercially available antioxidant compounds, e.g., phosphite antioxidants such as IRGAFOS; lactone antioxidants; phenolic antioxidants such as BHT; ascorbic acid; and IRGANOX and the like. Metal chelators include, e.g., EDTA, NTA, 1,10-phenanthroline, ACUMER 3100, DEQUEST, TAMOL 731, tripolyphosphate and other inorganic and organic compounds and polymers useful in chelating or dispersing metal salts. Radical scavengers include, e.g., TEMPO.

Treatment of wood is performed by contacting the wood with the wood treatment composition described herein, preferably under conditions that comply with AWPA Standards T1-16 and meet conditions for use specified in U1-16. In order to provide long term protection, the preservative needs to "fix" in the wood and not deplete too rapidly by volatilization or by leaching when the wood gets wet. It might be expected that enhanced penetration or enhanced movement of the preservative deep into the wood during treatment might also lead to reduced fixation of the organic wood preservative. However, it was discovered that the polymers used to provide enhanced penetration also effectively fix the organic biocide in the wood as seen by the dislodgeable residue assay in the examples.

EXAMPLES

Synthesis of Polyurethane Polymers:

Polyurethanes were synthesized from a bis hydroxy terminated polyalkoxide and a diisocyanate. 150 mL of anhydrous polyalkoxide solution in aromatic 200 (solvent, 10-30 wt % solution), diisocyanate (0.5 to 2 molar equivalents to of isocyanate to hydroxy group), was charged with 0.003% of a Tin catalyst (dibutyltin dilaurate) to the reactor. The reactor was heated to 90° C. with overhead stirring. The reaction mixture was held at 90° C. for 1 h.

In the examples where the polyurethane is capped, the residual isocyanate is measured using Surface SWYPEs™ test strips. The reaction product was cooled to room temperature and the capping reagent, mono amine (1 equivalent amine to unreacted isocyanate) was added to cap the remaining isocyanate groups in the reaction mixture. Alternatively, when mono alcohol (1 equivalent hydroxyl to unreacted isocyanate) was used as the capping reagent it was added at 90° C. and reacted for an additional 1 h at 90° C. The polymer solids of the PU solution was estimated from the conversion and the amount of reactants used for the reaction. The polymer solids are calculated as the sum of the reactive components in the synthesis of the polymer.

Procedure to Determine Diesel Compatibility:

In a clear, 1 oz vial, 0.1 gram of the polymer (on a 100% polymer solids basis) is diluted with 9.9 grams of diesel fuel (weight/weight) to a 1% solution of the polymer. The sample is maintained at room temperature for 24 hours. After 24 hours, the solution is checked for incompatibility, defined as phase separation, precipitation of the polymer as solids, and/or turbidity.

Wood Treatment Solution Preparation:

In a 4 liter vessel, 3 kilograms of wood treatment solution is prepared by adding diesel fuel, polymer solution, and DCOIT technical to obtain a final concentration of 2.5% DCOIT and 2.5% polymer solids.

For polymers at 30% solids, this equates to 2675 grams of diesel, 75 grams of DCOIT, and 250 grams of polymer solution.

For polymers at 10% solids, this equates to 2175 grams of diesel, 75 grams of DCOIT, and 750 grams of polymer solution.

Procedure to Treat Wood:

Three (27×9.0×1.9 cm) pieces of Southern Yellow Pine are loaded into a 6 L pressure vessel. The vessel is sealed and the pressure is reduced to 5 inches of Hg (17 kPa) and held for 5 minutes. The vacuum is turned off and sufficient treatment solution is drawn from a treatment solution container into the vessel through a fill valve to completely cover the wood. The vessel is pressurized to 100 psig (689 kPa) held for a minute, then to 150 psig (1136 kPa) for 1 minute. The pressure is released and the vessel is maintained at ambient pressure for 1 minute. The vessel is drained to the original treatment solution container via a dropout valve. The pressure cylinder is then placed under vacuum at >24 inches of Hg (>81 kPa) for forty five (45) minutes. The vessel is again drained to the original treatment solution container via a dropout valve. The pressure cylinder is then placed under vacuum at >24 inches of Hg (>81 kPa) for thirty (30) minutes. The vessel is again drained to the original treatment solution container via a dropout valve. The wood is removed, sticker stacked, and allowed to remain at room temperature until analysis.

Analysis of Treated Wood:

Dislodgeable Residue (DLR) Assay:

The dislodgeable residue assay was conducted by placing a piece of 4 inch square polyester fabric moistened with 2 ml of water on the wood. A piece of aluminum foil was placed over the cotton fabric and a 12.5 kg rolling pin was rolled back and forth over the foil covered wood twenty (20) times (10 up and back motions) being careful not to exert any downward nor upward pressure on the rolling pin during the rolling process. The fabric was removed and extracted with 15 milliliters of methanol in a sonication bath for 1 hour and then diluted with 5 milliliters of water. The methanol/water solution was analyzed by HPLC for DCOIT.

TABLE 1

Diesel Compatibility of Different Types of Polymer

| Polymer # | Trade Name | Generic Composition | Available From | Diesel Compatibility (1 wt %) |
|---|---|---|---|---|
| 1 | Rosin | Rosin | ChemicalStore.com | No |
| 2 | Terol 1304 | Aromatic polyester polyol | Huntsman | No |
| 3 | Isoexter 3061 | Aromatic polyester polyol | Huntsman | No |

TABLE 1-continued

Diesel Compatibility of Different Types of Polymer

| Polymer # | Trade Name | Generic Composition | Available From | Diesel Compatibility (1 wt %) |
|---|---|---|---|---|
| 4 | Lignin | Lignin | Aldrich | No |
| 5 | Polystyrene | Polystyrene | Aldrich | No |
| 6 | Poly vinyl chloride | Poly vinyl chloride | Aldrich | No |
| 7 | Laroflex MP45 | Copolymer of vinyl chloride and vinyl isobutyl ether | BASF | No |
| 8 | Isoexter 4404 | Aromatic polyester polyol | Huntsman | No |
| 9 | Ethocel 10FP | Ethylcellulose polymer | DOW | No |
| 10 | Ethocel 45 | Ethylcellulose polymer | DOW | No |
| 11 | Ethocel 100FP | Ethylcellulose polymer | DOW | No |
| 12 | Isopar V | Isoparaffinic fluid | Exxon | No |
| 13 | Pentalyn 755-M | Phenolic modified rosin ester | Eastman | No |
| 14 | Polyvinylimidazole | Polyvinylimidazole | DOW | No |
| 15 | Polyvinylpyridine | Polyvinylpyridine | Aldrich | No |
| 16 | Polyvinylpyrrolidone | Polyvinylpyrrolidone | Aldrich/Acros | No |
| 17 | Papi 27 | Polymeric MDI (pMDI) (Polymeric Methylene Diphenyl Diisocyanate) | DOW | No |
| 18 | Paraloid A-10S | Thermoplastic acrylic resin | Rohm and Haas | No |
| 19 | Paraloid UCD-685 | Acrylic polyol resin | Rohm and Haas | No |
| 20 | Paraloid F-10 Resin | Thermoplastic acrylic resin | DOW | No |
| 21 | Paraloid AT-9LO | Thermoplastic acrylic resin | Rohm and Haas | No |
| 22 | Paraloid B-67MT | Thermoplastic solution resin | Rohm and Haas | No |
| 23 | Paraloid AT-147 | Thermoset acrylic resin | Rohm and Haas | No |
| 24 | Paraloid AT-410 | Thermoset Acrylic Resin | DOW | No |
| 25 | Paraloid AT-148 | Thermoset Acrylic Resin | Rohm and Haas | No |
| 26 | Paraloid UCD-750 | Acrylic polyol resin | Rohm and Haas | No |
| 27 | Paraloid NAD-10-V | Acrylic Non-Aqueous Dispersion Resin | Rohm and Haas | No |
| 28 | Paraloid AT-76 | thermosetting acrylic intermediate | Rohm and Haas | No |
| 29 | Paraloid AT-63 | thermosetting acrylic intermediate | Rohm and Haas | No |
| 30 | Slack Wax | Paraffinic wax | Lone Star | No |

35

TABLE 2

Diesel Compatibility of PU Polymers with 100% p-iBO

| Polymer # | Polyol (bis OH) | Isocyanate (Bis NCO) | Cap | Solids Content (wt %) | (NCO/OH molar ratio) | Diesel compatibility (1 wt. %) |
|---|---|---|---|---|---|---|
| Ex-1 | OSP 680 (p-iBO) | IPDI | Butyl Amine | 30 | 2 | Yes |
| Ex-2 | OSP 680 (p-iBO) | IPDI | Octyl Amine | 30 | 2 | Yes |
| Ex-3 | OSP 680 (p-iBO) | IPDI | Octanol | 30 | 2 | Yes |
| Ex-4 | OSP 680 (p-iBO) | IPDI | No | 30 | 2 | Yes |
| Ex-5 | OSP 680 (p-iBO) | pMDI | Butyl Amine | 10 | 1.09 | Yes |
| Ex-6 | OSP 680 (p-iBO) | pMDI | Butyl Amine | 30 | 0.5 | Yes |
| Ex-7 | OSP 680 (p-iBO) | HMDI | Butyl Amine | 30 | 2 | Yes |
| Ex-8 | OSP 680 (p-iBO)[1] | pMDI | Butyl Amine | 30 | 0.5 | Yes |
| Ex-9 | OSP 680 (p-iBO)[1] | MDI | Butyl Amine | 30 | 1.09 | Yes |
| Comp. 1 | OSP 680 (p-iBO) | pMDI | Butyl Amine | 10 | 2 | No |
| Comp. 2 | OSP 680 (p-iBO) | IPDI | Butyl Amine | 10 | 4 | No |
| Comp. 3 | OSP 680 (i-nBO) | IPDI | EO/PO Jeffamine | 10 | 0.5 | No |
| Ex-10 | OSP 320 (p-iBO) | IPDI | Butyl Amine | 30 | 2 | Yes |
| Ex-11 | OSP 320 (p-iBO) | pMDI | Butyl Amine | 30 | 1.09 | Yes |
| Ex-12 | OSP 320 (p-iBO)[1] | pMDI | Butyl Amine | 30 | 0.5 | Yes |

TABLE 2-continued

Diesel Compatibility of PU Polymers with 100% p-iBO

| Polymer # | Polyol (bis OH) | Isocyanate (Bis NCO) | Cap | Solids Content (wt %) | (NCO/OH molar ratio) | Diesel compatibility (1 wt. %) |
|---|---|---|---|---|---|---|
| Ex-13 | OSP 320 (p-iBO)[1] | pMDI | Butyl Amine | 30 | 1.09 | Yes |
| Ex-14 | OSP 320 (p-iBO)[1] | IPDI | Butyl Amine | 30 | 1.09 | Yes |

TABLE 3

Diesel Compatibility of PU Polymers with ≥6% p-iBO + ≤94% iPO

| Polymer # | Polyol (bis OH) | Isocyanate (Bis NCO) | Cap | Solids Content (wt. %) | (NCO/OH molar ratio) | Diesel compatibility (1 wt. %) |
|---|---|---|---|---|---|---|
| Ex-15 | 95 wt % OSP 680 (p-iBO) + 5 wt % P4000 (iPO) | IPDI | Butyl Amine | 10 | 1.09 | Yes |
| Ex-16 | 94 wt % OSP 680 (p-iBO) + 6 wt % P4000 (iPO) | IPDI | Butyl Amine | 10 | 2 | Yes |
| Ex-17 | 50 wt % OSP 680 (p-iBO) + 50 wt % P4000 (iPO) | IPDI | Butyl Amine | 10 | 1.09 | Yes |
| Ex-18 | 6 wt % OSP 680 (p-iBO) + 94 wt % P4000 (p-iPO) | IPDI | Butyl amine | 10 | 2 | Yes |
| Comp. 4 | 5 wt % OSP 680 (p-iBO) + 95 wt % P4000 (iPO) | IPDI | Butyl Amine | 10 | 4 | No |
| Comp 5 | P4000 (p-iPO) | IPDI | Butyl Amine | 10 | 2 | No |

TABLE 4

Diesel Compatibility of PU Polymers with ≥83% p-iBO + ≤17% p-nBO

| Polymer # | Polyol (bis OH) | Isocyanate (Bis NCO) | Cap | Solids Content (Wt. %) | (NCO/OH molar ratio) | Diesel compatibility (1 wt. %) |
|---|---|---|---|---|---|---|
| Ex-19 | 95 wt % OSP 680 (p-iBO) + 5 wt % p-THF (p-nBO) | IPDI | Butyl amine | 10 | 2 | Yes |
| Ex-20 | 90 wt % OSP 680 (p-iBO) + 10 wt % p-THF (p-nBO) | IPDI | Butyl amine | 10 | 2 | Yes |
| Ex-21 | 85 wt % OSP 680 (p-iBO) + 15 wt % p-THF (p-nBO) | IPDI | Butyl amine | 10 | 2 | Yes |

TABLE 4-continued

Diesel Compatibility of PU Polymers with ≥83% p-iBO + ≤17% p-nBO

| Polymer # | Polyol (bis OH) | Isocyanate (Bis NCO) | Cap | Solids Content (Wt. %) | (NCO/OH molar ratio) | Diesel compatibility (1 wt. %) |
|---|---|---|---|---|---|---|
| Ex-22 | 83 wt % OSP 680 (p-iBO) + 17 wt % p-THF (p-nBO) | IPDI | Butyl amine | 10 | 2 | Yes |
| Comp. 6 | 50 wt % OSP 680 (p-iBO) + 50 wt % p-THF (p-nBO) | IPDI | Butyl amine | 10 | 2 | No |
| Comp. 7 | 75 wt % OSP 680 (p-iBO) + 25wt % p-THF (p-nBO) | IPDI | Butyl amine | 10 | 2 | No |
| Comp. 8 | 80 wt % OSP 680 (p-iBO) + 20 wt % p-THF (p-nBO) | IPDI | Butyl amine | 10 | 2 | No |
| Comp. 9 | 82 wt % OSP 680 (p-iBO) + 18 wt % p-THF (p-nBO) | IPDI | Butyl amine | 10 | 2 | No |
| Comp. 10 | poly-THF (p-nBO) | IPDI | Butyl Amine | 10 | 2 | No |

TABLE 7

DLR Test results for IPDI Isocyanate

| Treatment | Polymer ID | % DCOIT | % Polymer | 24 hr DLR (ug/cm2) Board A | 24 hr DLR (ug/cm2) Board B | 24 hr DLR (ug/cm2) Board C | Average 24 hr DLR (ug/cm2) |
|---|---|---|---|---|---|---|---|
| #1 | None | 2.5 | 0 | 0.72 | 1.32 | 0.51 | 0.85 |
| #2 | EX-2 | 2.5 | 2.5 | 0.46 | 0.58 | 0.55 | 0.53 |
| #3 | EX-10 | 2.5 | 2.5 | 0.57 | 0.50 | 0.37 | 0.48 |
| #4 | EX-14 | 2.5 | 2.5 | 0.55 | 0.50 | 0.43 | 0.49 |

| Treatment | Polymer ID | % DCOIT | % Polymer | 7 day DLR (ug/cm2) Board A | 7 day DLR (ug/cm2) Board B | 7 day DLR (ug/cm2) Board C | Average 7 day DLR (ug/cm2) |
|---|---|---|---|---|---|---|---|
| #1 | None | 2.5 | 0 | 0.36 | 1.00 | 0.75 | 0.70 |
| #2 | EX-2 | 2.5 | 2.5 | 0.32 | 0.52 | 0.61 | 0.48 |
| #3 | EX-10 | 2.5 | 2.5 | 0.28 | 0.44 | 0.55 | 0.42 |
| #4 | EX-14 | 2.5 | 2.5 | 0.37 | 0.47 | 0.63 | 0.49 |

TABLE 8

DLR Test results for IPDI/MDI Isocyanate

| Treatment | Polymer ID | % DCOIT | % Polymer | 24 hr DLR (ug/cm2) Board A | 24 hr DLR (ug/cm2) Board B | 24 hr DLR (ug/cm2) Board E | 24 hr DLR (ug/cm2) Board F | Average 24 hr DLR (ug/cm2) |
|---|---|---|---|---|---|---|---|---|
| #5 | None | 2.5 | 2.5 | 0.72 | 1.32 | 0.89 | 0.59 | 1.17 |
| #6 | EX-12 | 2.5 | 2.5 | 1.96 | 1.01 | 0.47 | 0.41 | 1.28 |
| #7 | EX-11 | 2.5 | 2.5 | Not Measured | Not Measured | 0.33 | 0.32 | 0.33 |
| #8 | EX-5 | 2.5 | 2.5 | Not Measured | Not Measured | 0.47 | 0.33 | 0.40 |
| #9 | EX-6 | 2.5 | 2.5 | 1.80 | 0.94 | 0.88 | 0.53 | 1.38 |
| #10 | EX-13 | 2.5 | 2.5 | 1.92 | 0.69 | 1.64 | 0.68 | 1.64 |

| Treatment | Polymer ID | % DCOIT | % Polymer | 7 day DLR (ug/cm2) Board A | 7 day DLR (ug/cm2) Board B | 7 day DLR (ug/cm2) Board E | 7 day DLR (ug/cm2) Board F | Average 7 day DLR (ug/cm2) |
|---|---|---|---|---|---|---|---|---|
| #5 | None | 2.5 | 2.5 | 0.36 | 1.00 | 0.86 | 0.40 | 0.87 |
| #6 | EX-12 | 2.5 | 2.5 | 0.53 | 0.42 | 0.43 | 0.45 | 0.61 |
| #7 | EX-11 | 2.5 | 2.5 | Not Measured | Not Measured | 0.34 | 0.36 | 0.35 |

TABLE 8-continued

| | | | | DLR Test results for IPDI/MDI Isocyanate | | | | |
| --- | --- | --- | --- | --- | --- | --- | --- | --- |
| #8 | EX-5 | 2.5 | 2.5 | Not Measured | Not Measured | 0.37 | 0.29 | 0.33 |
| #9 | EX-6 | 2.5 | 2.5 | 0.62 | 0.45 | 0.53 | 0.35 | 0.65 |
| #10 | EX-13 | 2.5 | 2.5 | 0.58 | 0.40 | 0.80 | 0.42 | 0.73 |

The invention claimed is:

1. A non-aqueous composition for preserving wood comprising:
  a) a polyurethane polymer comprising the reaction product of a polyol and an isocyanate in a non-aqueous solvent;
  (b) an organic solvent; and
  (c) at least one wood preservative selected from among halogenated isothiazolone biocides, halogenated carbamate fungicides and azole fungicides
wherein the organic solvent comprises diesel, and the polyol is selected from the group consisting of 100% poly-i-butylene oxide, 6 to 99.99% poly-i-butylene oxide+0.01 to 94% p-propylene oxide, and 83 to 99.99% poly-i-butylene oxide+0.01-17% p-tetrahydrofuran.

2. A method for preserving wood said method comprising contacting wood with the wood treatment composition of claim 1.

3. The method of claim 2 in which the wood preservative is 4,5-dichloro-2-n-octyl-4-isothiazolin-3-one.

4. The method of claim 2 wherein the polyurethane polymer is capped.

5. The method of claim 2 wherein the polyurethane polymer is capped with a monoamine or monoalchohol.

6. The method of claim 5 wherein the polyurethane polymer is capped with either butyl amine, octanol, or octyl amine.

7. The method of claim 2 wherein the isocyanate is isophorone diisocyanate.

8. The method of claim 2 wherein the isocyanate is polymeric methylene diphenyl diisocyanate.

* * * * *